United States Patent
Lee et al.

(10) Patent No.: US 10,222,641 B2
(45) Date of Patent: Mar. 5, 2019

(54) DISPLAY PANEL AND PROTECTIVE MEMBER

(71) Applicant: Samsung Display Co., Ltd., Yongin-Si, Gyeonggi-Do (KR)

(72) Inventors: Dong-cheol Lee, Hwaseong-si (KR); Tae-chang Kim, Anyang-si (KR); Seki Park, Hwaseong-si (KR); Myunghun Baek, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 97 days.

(21) Appl. No.: 15/296,535

(22) Filed: Oct. 18, 2016

(65) Prior Publication Data
US 2017/0123258 A1   May 4, 2017

(30) Foreign Application Priority Data

Nov. 3, 2015   (KR) .......................... 10-2015-0154079

(51) Int. Cl.
*F21V 8/00*   (2006.01)
*G02F 1/1333*   (2006.01)

(52) U.S. Cl.
CPC ....... *G02F 1/133308* (2013.01); *G02B 6/005* (2013.01); *G02B 6/0088* (2013.01); *G02B 6/0093* (2013.01); *G02F 2001/13332* (2013.01); *G02F 2001/133314* (2013.01); *G02F 2001/133317* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 9,874,680 B2 * | 1/2018 | Yu | ........................ G02B 6/0068 |
| 2009/0316062 A1 * | 12/2009 | Nishizawa | ........ G02F 1/133305 349/58 |
| 2011/0249217 A1 | 10/2011 | Park et al. | |
| 2012/0026424 A1 | 2/2012 | Youk et al. | |
| 2014/0009914 A1 * | 1/2014 | Cho | ......................... G09F 9/35 362/97.3 |
| 2014/0078720 A1 | 3/2014 | An et al. | |
| 2014/0111974 A1 * | 4/2014 | Choi | ......................... G09F 9/30 362/97.1 |
| 2014/0168564 A1 | 6/2014 | Lee et al. | |

(Continued)

FOREIGN PATENT DOCUMENTS

| KR | 1020120004648 A | 1/2012 |
|---|---|---|
| KR | 101327743 B1 | 11/2013 |
| KR | 1020140142919 A | 12/2014 |

*Primary Examiner* — Britt D Hanley
(74) *Attorney, Agent, or Firm* — Cantor Colburn LLP (57) ABSTRACT

A display apparatus includes a display panel and a first protection member which accommodates the display panel. The first protection member includes first sidewalls facing each other and second sidewalls connected to ends of the first sidewalls to face each other. The first and second sidewalls are disposed to surround a side surface of the display panel, the first sidewalls are curved symmetrical to each other, and a distance between central portions of the first sidewalls facing each other is a minimum distance between the first sidewalls, and a distance between ends of the first sidewalls facing each other is a maximum distance between the first sidewalls.

20 Claims, 6 Drawing Sheets

(56) References Cited

U.S. PATENT DOCUMENTS

| | | | |
|---|---|---|---|
| 2015/0285467 A1* | 10/2015 | Choi | G09F 9/30 362/97.1 |
| 2015/0286088 A1* | 10/2015 | Kim | G02F 1/133308 349/58 |
| 2016/0161085 A1* | 6/2016 | Kwon | G02F 1/133305 362/97.1 |
| 2016/0207065 A1* | 7/2016 | Lee | G02F 1/133305 |
| 2016/0216435 A1* | 7/2016 | Park | G02B 6/0078 |
| 2016/0360628 A1* | 12/2016 | Yu | G02B 6/0088 |
| 2017/0184775 A1* | 6/2017 | Kang | G02B 6/0045 |
| 2017/0261684 A1* | 9/2017 | Soh | G02B 6/0093 |

* cited by examiner

DISPLAY PANEL AND PROTECTIVE MEMBER

This application claims priority to Korean Patent Application No. 10-2015-0154079, filed on Nov. 3, 2015, and all the benefits accruing therefrom under 35 U.S.C. § 119, the content of which in its entirety is herein incorporated by reference.

BACKGROUND

1. Field

The disclosure herein relates to a display apparatus, and more particularly, to a display apparatus with improved product reliability.

2. Description of the Related Art

In general, a display apparatus includes a display panel for displaying an image and a backlight unit for providing light to the display panel.

The display panel may include a first substrate on which a plurality of pixels are disposed, a second substrate disposed to face the first substrate, and an image display layer disposed between the first and second substrates. The image display layer is driven by the pixels, and optical transmittance is adjusted by the image display layer to display an image. The image display layer may be a liquid crystal layer, an electrowetting layer, or electrophoresis layer.

The display apparatus has been manufactured having a flat shape. However, recently, a display apparatus having a curved shape is being developed. The display apparatus having the curved shape may be manufactured by accommodating a curved display panel into a case having a curved shape after a flat display panel is deformed into the curved display panel.

SUMMARY

The disclosure provides a display apparatus a display apparatus in which damage of a display panel is effectively prevented to improve product reliability.

According to an embodiment of the inventive concept, a display apparatus includes: a display panel; and a first protection member which accommodates the display panel, where the first protection member includes: first sidewalls facing each other; and second sidewalls connected to ends of the first sidewalls to face each other. In such an embodiment, the first and second sidewalls are disposed to surround a side surface of the display panel, and the first sidewalls are curved symmetrical to each other. In such an embodiment, and a distance between central portions of the first sidewalls facing each other is a minimum distance between the first side walls, and a distance between ends of the first sidewalls facing each other is a maximum distance between the first side walls.

In an embodiment, the display panel and the first protection member may be curved with respect to a first direction.

In an embodiment, the display panel may include: long sides extending in a first direction to face each other; and short sides extending in a second direction crossing the first direction, where the short sides may be connected to ends of the long sides to face each other.

In an embodiment, the first sidewalls may be disposed to correspond to the long sides of the display panel, and the second sidewalls may be disposed to face the short sides of the display panel and extend in the second direction.

In an embodiment, a top surface of each of first and second sidewalls may have a width less than a width of a bottom surface of each of the first and second sidewalls. In such an embodiment, a distance between each of inner surfaces of the first and second sidewalls, which are defined as side surfaces facing each other of the first and second sidewalls and each of outer surfaces of the first and second sidewalls, which are defined as surfaces opposite to the inner surfaces of the first and second sidewalls may gradually increase from the top surface of each of the first and second sidewalls to the bottom surface of each of the first and second sidewalls, and each of the outer surfaces of the first and second sidewalls may have a protruding shape.

In an embodiment, the top surface of each of the first and second sidewalls may be disposed above the display panel, and the side surface of the display panel may be disposed to be spaced apart from the inner surface of each of the first and second sidewalls with a predetermined distance.

In an embodiment, the display apparatuses may further include a bonding member disposed between the side surface of the display panel and the inner surface of each of the first and second sidewalls to allow the side surface of the display panel to adhere to the inner surface of each of the first and second sidewalls.

In an embodiment, a distance between the inner surface of each of the first sidewalls and the side surface of the display panel facing the inner surface of each of the first sidewalls in the second direction may be equal to or greater than about 0.5 millimeter (mm) and equal to or less than about 1.0 mm.

In an embodiment, the first protection member may further include: a first extension part spaced apart from the top surface of each of the first and second sidewalls with a predetermined distance, where the first extension part may be connected to a predetermined area of the inner surface of each of the first and second sidewalls; and a second extension part spaced apart from the inner surface of each of the first and second sidewalls with a predetermined distance, where the second extension part is connected to a predetermined area of a lower surface of the first extension part. In such an embodiment, the first extension part may extend perpendicular to the inner surface of each of the first and second sidewalls, and the second extension part may extend perpendicular to the first extension part.

In an embodiment, an area of the display panel on a plane may include: a display area; and a non-display area around the display area, where the non-display area of the display panel may be disposed on the first extension part.

In an embodiment, the display apparatus may further include an adhesion member disposed between the non-display area of the display panel and the first extension part to allow the non-display area of the display panel to adhere to the first extension part.

In an embodiment, the display apparatus may further include: an optical member disposed under the display panel; a light guide plate disposed under the optical member; a light source disposed adjacent to a side surface of the light guide plate in the second direction; a reflection sheet disposed under the light guide plate; and a second protection member coupled to the first protection member to accommodate the optical member, the light guide plate, the light source, and the reflection sheet, where the second protection member may be curved with respect to the first direction.

In an embodiment, a predetermined portion of the optical member, which is adjacent to a side surface of the optical member may be disposed under the first extension part, and the side surface of the optical member may be disposed adjacent to a predetermined area of the second extension part, which is adjacent to the lower surface of the first extension part.

In an embodiment, the second protection member may include: a bottom part curved with respect to the first direction; and a third sidewall connected to an end of the bottom part to extend parallel to the inner surface of each of the first and second sidewalls, where the third sidewall may be inserted into a space between the inner surface of each of the first and second sidewalls and the second extension part.

In an embodiment, the bottom part may include a protrusion which protrudes upward from an area of the bottom part except for a predetermined area of the bottom part, which is adjacent to a side surface of the bottom part. In such an embodiment, the reflection sheet, the light guide plate and the optical member may be disposed on the protrusion, and the light source is disposed on a side surface of the second extension part, which faces the side surface of the light guide plate in the second direction.

In an embodiment, the display apparatus may further include: an optical member disposed under the display panel; a light source disposed under the optical member; a reflection sheet disposed under the optical member; and a second protection member. In such an embodiment, the second protection member may include: a bottom part curved with respect to the first direction; and a third sidewall connected to an end of the bottom part to extend parallel to the inner surface of each of the first and second sidewalls and inserted into a space between the inner surface of each of the first and second sidewalls and the second extension part. In such an embodiment, the first protection member further include a third extension part spaced apart from the first extension part and connected to an inner surface of the second extension part, which is opposite to an outer surface of the second extension part facing the inner surface of each of the first and second sidewalls, to extend perpendicular to the second extension part, the second protection member may be curved with respect to the first direction, and a predetermined area of the optical member, which is adjacent to a side surface of the optical member, may be disposed between the first extension part and the third extension part.

In an embodiment, the bottom part may include a plurality of grooves, which are recessed downward from a top surface of the bottom part and extends in the second direction, the light source may include: a plurality of light source substrates extending in the second direction; and a plurality of light source units disposed on the light source substrates. In such an embodiment, a plurality of holes corresponding to the light source units may be defined in the reflection sheet, the light source substrates may be disposed in the grooves, the reflection sheet may be disposed on the bottom part, and the light source units may be inserted into the holes.

In an embodiment, the second sidewalls may be curved symmetrical to each other, a distance between central portions of the second sidewalls facing each other may be a minimum distance between the second side walls, and a distance between ends of the second sidewalls facing each other may be a maximum distance between the second side walls.

In an embodiment, a distance between the inner surface of each of the first sidewalls and the side surface of the display panel facing each other in the second diction may be equal to or greater than about 0.5 millimeter and equal to or less than about 1.0 millimeter, and a distance between the inner surface of each of the second sidewalls and the side surface of the display panel facing each other in the first direction may be equal to or greater than about 0.5 millimeter and equal to or less than about 1.0 millimeter.

According to an embodiment, a display apparatus includes: a display panel; a first protection member which supports the display panel and surrounds a side surface of the display panel; and an adhesion member disposed between the side surface of the display panel and an inner surface of the first protection member, which faces the side surface of the display panel. In such an embodiment, the first protection member includes: first sidewalls facing each other; and second sidewalls connected to ends of the first sidewalls to face each other. In such an embodiment, the first sidewalls are curved with reference to the side surface of the display panel facing the first sidewalls, and have concave shapes symmetrical to each other, and the second sidewalls are curved with reference to the side surface of the display panel facing the second sidewalls and have concave shapes symmetrical to each other.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the inventive concept will be described below in more detail with reference to the accompanying drawings.

Figure 1:
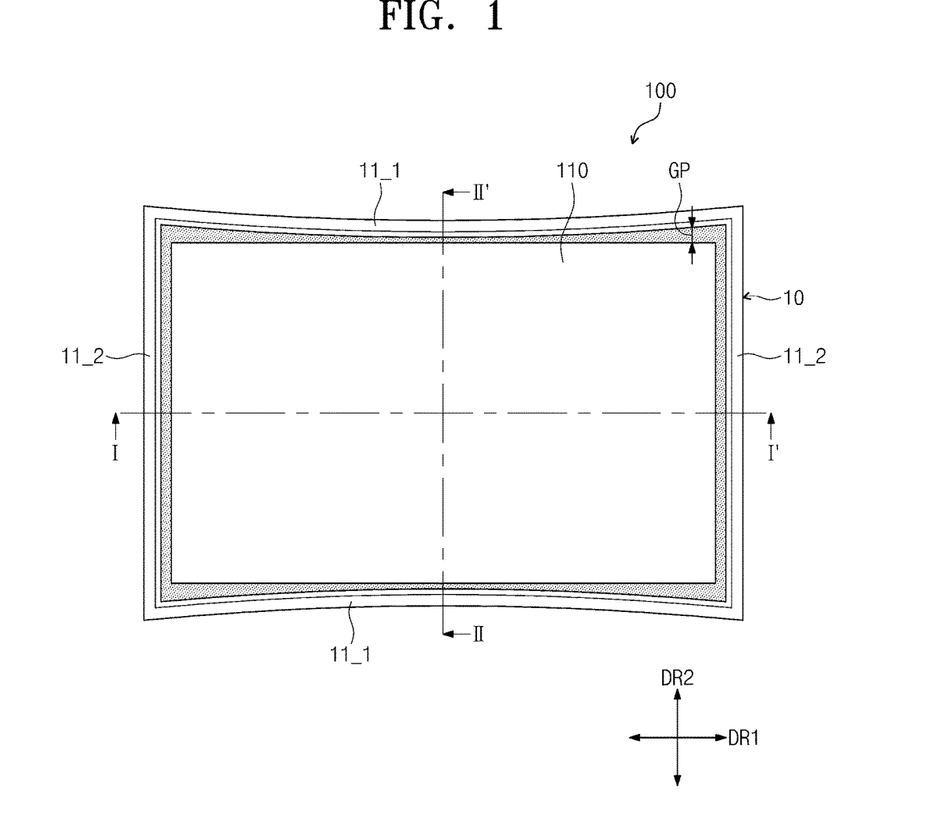
FIG. 1 is an upper plan view of an embodiment of a display apparatus according to the inventive concept.

FIG. 1 is an upper plan view of an embodiment of a display apparatus according to the inventive concept.

Referring to FIG. 1, an embodiment of a display apparatus 100 includes a display panel 110 for displaying an image, and a first protection member 10 that accommodates and protects the display panel 110.

The display panel 110 may have long sides that extend in a first direction DR1 to face each other and short sides that are respectively connected to ends of the long sides to extend in a second direction DR2 crossing the first direction DR1 and face each other. In an embodiment, as illustrated in FIG. 1, the display panel 110 may have a rectangular shape, but is not limited thereto. In one alternative embodiment, for example, the display panel 110 may have a square shape.

The first protection member 10 supports the display panel 110 and surrounds a side surface of the display panel 110. The first protection member 10 for supporting the display panel 110 will be described in detail with reference to FIGS. 3 and 5.

The first protection member 10 includes first sidewalls 11_1 facing each other in the second direction DR2 and second sidewalls 11_2 that are respectively connected to ends of the first sidewalls 11_1 to face each other in the first direction DR1. The first and second sidewalls 11_1 and 11_2 connected to each other may define the sidewalls of the first protection member 10.

The first and second sidewalls 11_1 and 11_2 of the first protection member 10 are disposed outside the display panel 110. The first and second sidewalls 11_1 and 11_2 connected to each other are disposed to surround the side surface of the display panel 110, e.g., the long sides and the short sides.

The first sidewalls 11_1 are disposed to face the long sides of the display panel 110 to correspond to the long sides of the display panel 110. The second sidewalls 11_2 are disposed to face the short sides of the display panel 110 to correspond to the short sides of the display panel 110 and extend parallel to each other in the second direction DR2.

In an embodiment, each of the first sidewalls 11_1 is curved to the side surface of the display panel 110 facing the first sidewall 11_1. In such an embodiment, the first sidewalls 11_1 have concave shapes that are symmetrical to each other. IN such an embodiment, the first sidewalls 11_1 may be curved to be symmetrical to each other. A distance between centers of the first sidewalls 11_1 facing each other is set as a minimum distance, and a distance between ends of the first sidewalls 11_1 facing each other is set as a maximum distance among distances between the first sidewalls 11_1. In an exemplary embodiment, each of the first sidewalls 11_1 has the concave shape, as illustrated in FIG. 1, but not being limited thereto. In an alternative embodiment, each of the second sidewalls 11_2 may have a concave shape, and the first sidewalls 11_1 may extend in the first direction DR1.

A distance GP between each of the first sidewalls 11_1 and each of the long sides of the display panel 110 in the second direction DR2 may be equal to or greater than about 0.5 millimeter (mm) and equal to or less than about 1.0 mm.

Figure 2:
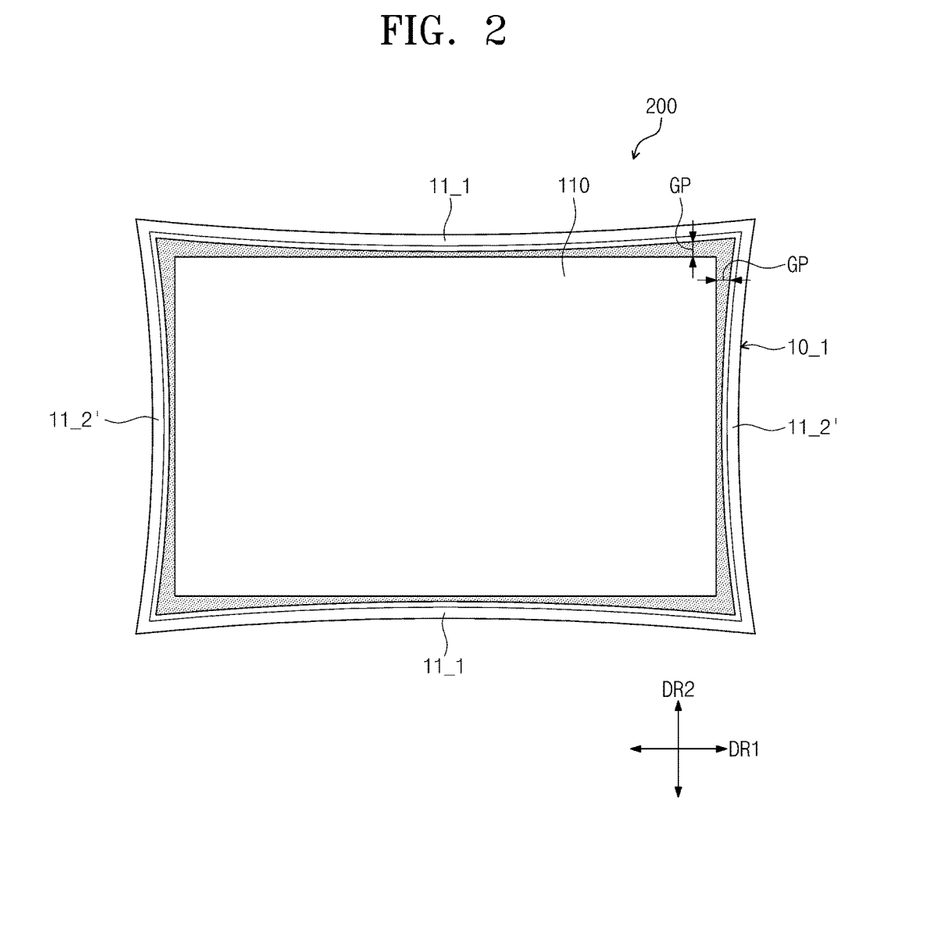
FIG. 2 is a lower plan view of an alternative embodiment of a display apparatus according to the inventive concept.

FIG. 2 is a lower plan view of an alternative embodiment of a display apparatus according to the inventive concept.

A display apparatus 200 of FIG. 2 is substantially the same as the display apparatus 100 of FIG. 1 except for a first protection member 10_1. The same or like elements shown in FIG. 2 have been labeled with the same reference characters as used above to describe the embodiments of the display apparatus shown in FIG. 1, and any repetitive detailed description thereof will hereinafter be omitted or simplified.

Referring to FIG. 2, in an embodiment, the first protection member 10_1 of the display apparatus 200 includes first sidewalls 11_1 facing each other in the second direction DR2 and second sidewalls 11_2' that are respectively connected to ends of the first sidewalls 11_1 to face each other in the first direction DR1. The first sidewalls 11_1 of FIG. 2 may have the same shape as the first sidewalls 11_1 of FIG. 1.

In an embodiment, each of the second sidewalls 11_2' is curved to the side surface of the display panel 110 facing the second sidewalls 11_2'. In such an embodiment, the second sidewalls 11_2' have concave shapes that are symmetrical to each other. In such an embodiment, the second sidewalls 11_2' are curved to be symmetrical to each other. A distance between centers of the second sidewalls 11_2' facing each other is set as a minimum distance, and a distance between ends of the second sidewalls 11_2' facing each other is set as a maximum distance among distances between the second sidewalls 11_2'.

In such an embodiment, as shown in FIG. 2, the second sidewalls 11_2' as well as the first sidewall 11_1 may have concave shapes that are symmetrical to each other.

A distance GP between each of the first sidewalls 11_1 and each of the long sides of the display panel 110 in the second direction DR2 and a distance GP between each of the second sidewalls 11_2' and the short sides of the display panel 110 in the first direction DR1 may be equal to or greater than about 0.5 mm and equal to or less than about 1.0 mm.

In an embodiment, the first protection member may have a rectangular shape larger than the display apparatus, and the sidewalls of the first protection member may be disposed adjacent, e.g., close, to the side surface of the display panel 110. In such an embodiment, when the display panel 110 is disposed on the first protection member by the manufacturing apparatus or manufacturer who couples the display panel 110 to the first protection member, an edge of the display panel 110 may collide with the first protection member. As a result, the edge of the display panel 110 may be relatively easily damaged by the collision when compared to the long sides and short sides of the display panel 110.

However, in an embodiment of the inventive concept, the first sidewall 11_1 of the first protection member 10 may have the concave shape, or each of the first and second sidewalls 11_1 and 11_2' of the first protection member 10_1 may have the concave shape. In such an embodiment, the inside of each of the first protection members 10 and 10_1 corresponding to the edge of the display panel 110 may be far away from the edge of the display panel 110.

Thus, since a space between the edge of the display panel 110 and the inside of each of the first protection members 10 and 10_1 corresponding to the edge of the edge of the display panel 110 is sufficiently secured, the possibility of the collision of the edge of the display panel 110 with the first protection members 10 and 10_1 may be very reduced. As a result, the edge of the display panel 110 may be prevented from being damaged.

In embodiments of the display apparatus 100 and 200 described above, the damage of the display panel 110 may be effectively prevented to improve product reliability.

Figure 3:
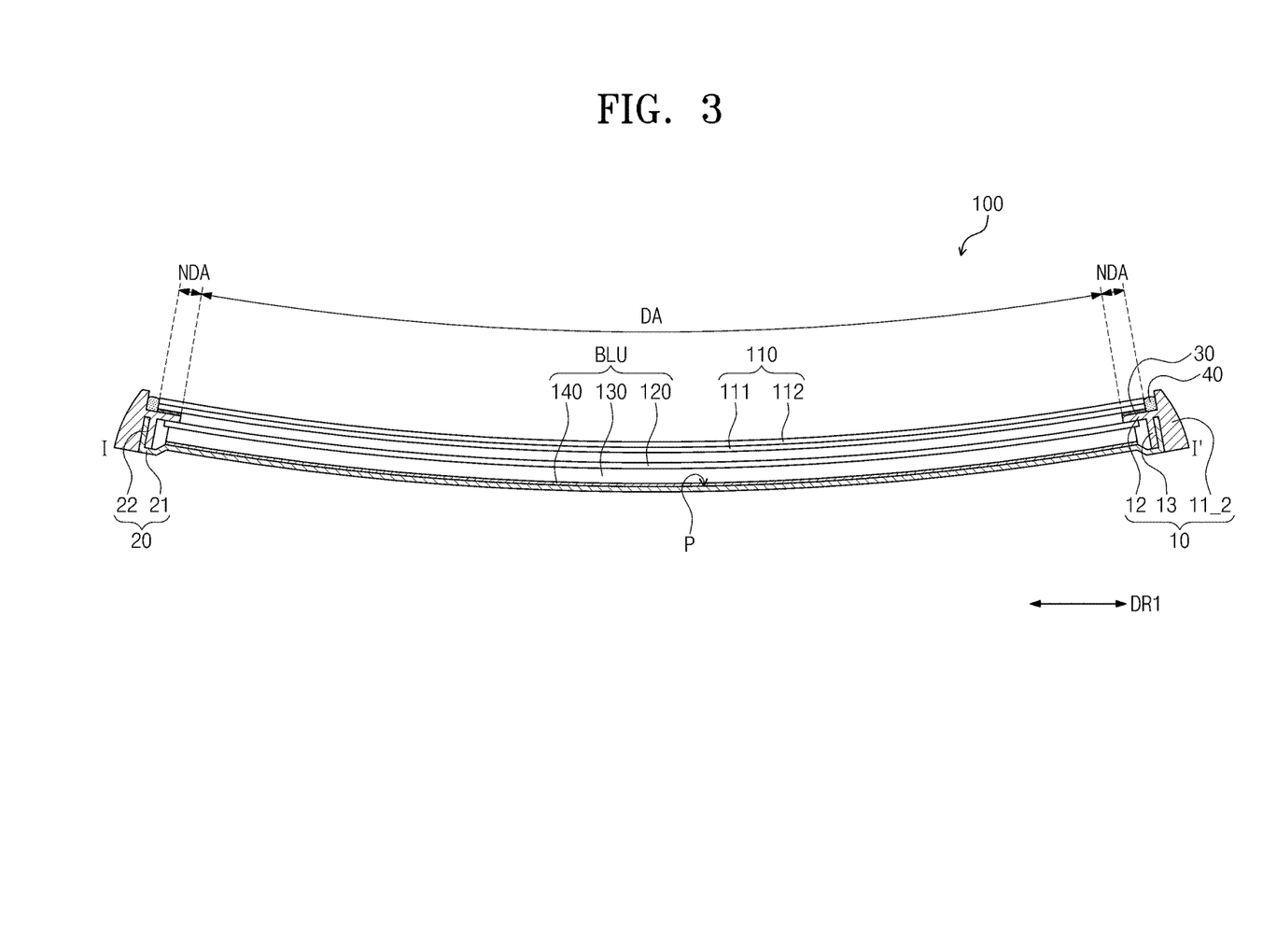
FIG. 3 is a cross-sectional view taken along line I-I' of FIG. 1.
Figure 4:
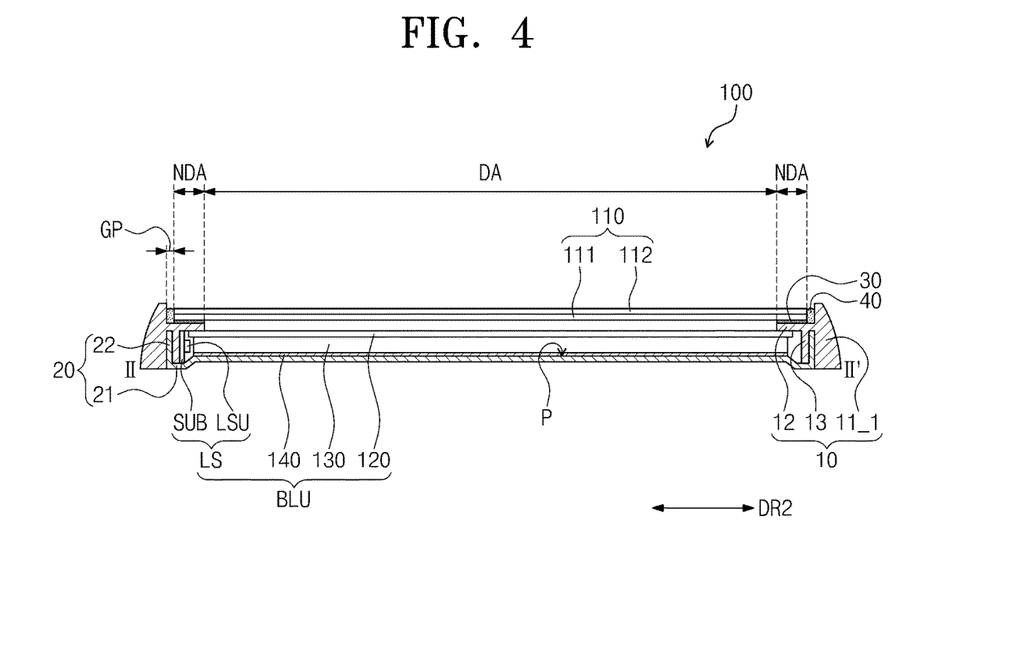
FIG. 4 is a cross-sectional view taken along line II-II' of FIG. 1.
Figure 5:
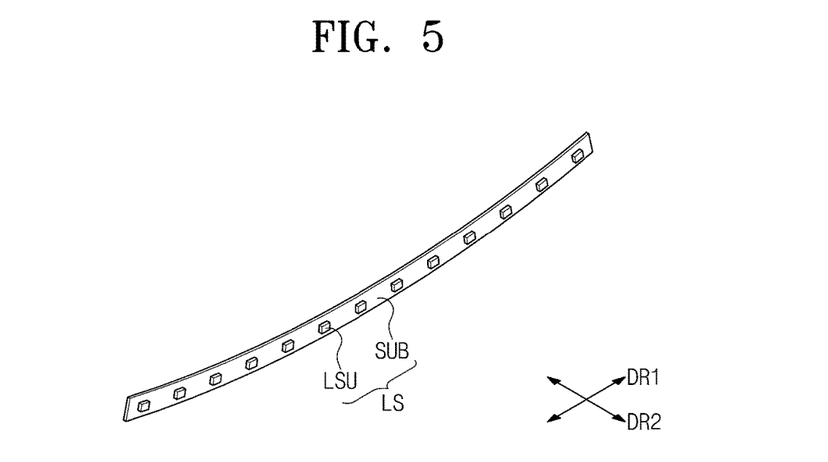
FIG. 5 is a perspective view of a light source of FIG. 4.
Figure 6:
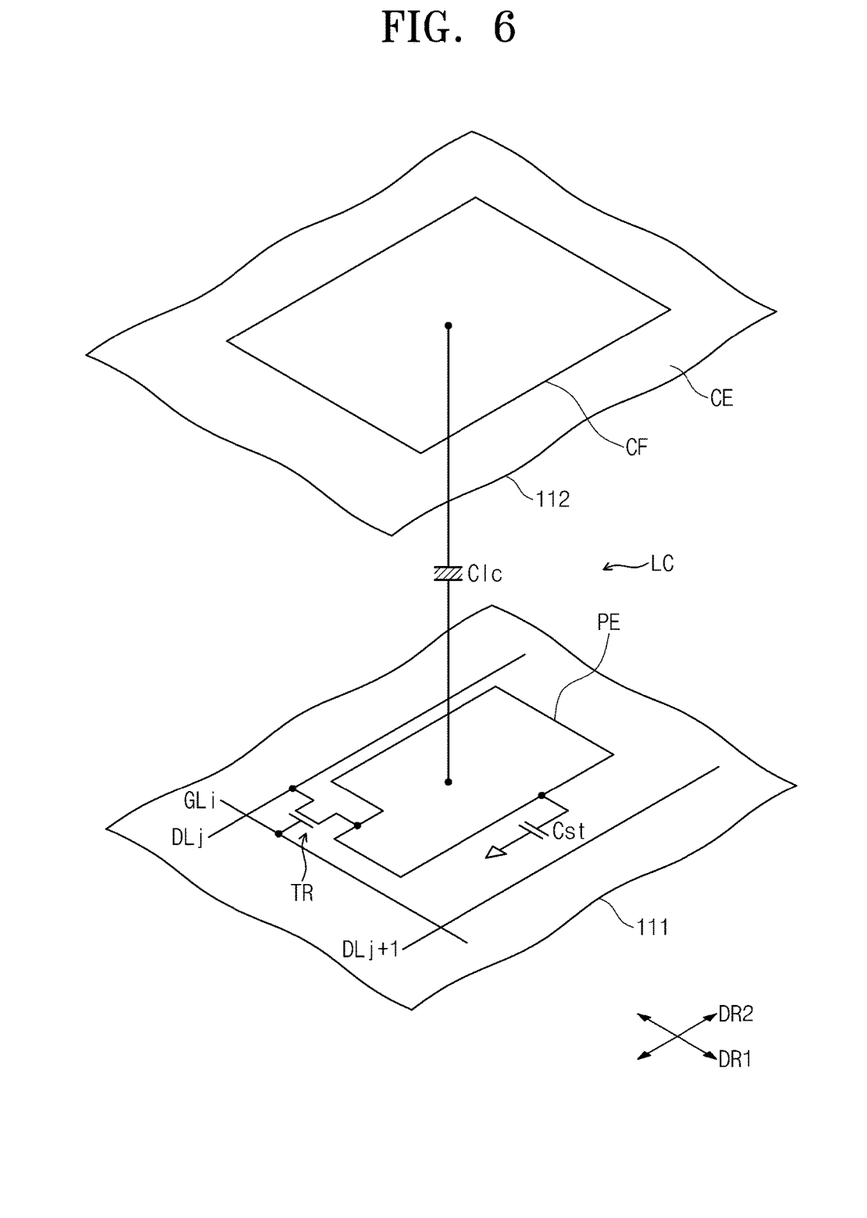
FIG. 6 is a view of a pixel of a display panel of FIG. 1.

FIG. 3 is a cross-sectional view taken along line I-I' of FIG. 1. FIG. 4 is a cross-sectional view taken along line II-II' of FIG. 1. FIG. 5 is a perspective view of a light source of FIG. 4. FIG. 6 is a view of a pixel of a display panel of FIG. 1.

Referring to FIGS. 3 to 5, an embodiment of the display apparatus 100 may be a curved display apparatus having a curved shape. In one embodiment, for example, the display apparatus 100 may be curved with the first direction DR1. In an embodiment, in a plane defined by the first direction DR1 and the second direction DR2, the display panel 110 may be curved so that a top surface of the display panel 110 has a recessed or concave shape, and a bottom surface of the display panel 110 has a protruding or convex shape. The display apparatus 100 may have a flat shape in the second direction DR2 as illustrated in FIG. 4.

The display apparatus 100 includes a display panel 110 for displaying an image by using light, a backlight unit BLU disposed on a rear side of the display panel 110 to generate light and provide the light to the display panel 110, and protection members 10 and 20 that accommodate the display panel 110 and the backlight unit BLU. An area on a plane of the display panel 110 may include a display area DA on which an image is displayed and a non-display area NDA surrounding the display area DA and on which an image is not displayed.

Although not shown, the display panel 110 includes a plurality of pixels for displaying an image by using the light. The pixels are disposed on the display area DA of the display panel 110. Each of the pixels may display one of primary colors. In one embodiment, for example, the primary colors may include red, green, and blue colors. However, an embodiment of the inventive concept is not limited thereto. In one alternative embodiment, for example, the primary colors may further include various colors such as a white color, a yellow color, cyan, and magenta.

The display panel 110 may be a liquid crystal display panel including a liquid crystal layer. However, an embodiment of the inventive concept is not limited thereto. In one alternative embodiment, for example, the display panel 110 may be an electrowetting display panel including an electrowetting layer or an electrophoretic display panel including an electrophoretic layer.

The backlight unit BLU may be an edge type backlight unit. The backlight unit BLU includes an optical member 120, a light guide plate 130, a reflection sheet 140, and a light source LS.

In such an embodiment, the display panel 110, the optical member 120, the light guide plate 130, the reflection sheet 140 and the light source LS may be curved in the first direction DR1. The reflection sheet 140 may be disposed on or below the light guide plate 130, and the optical member 120 may be disposed on or above the light guide plate 130. The display panel 110 is disposed on or above the optical member 120. The light source LS is disposed adjacent to a side surface of the light guide plate 130 in the second direction DR2.

The light source LS generates light to be used in the display panel 110. As illustrated in FIG. 5, the light source LS includes a light source substrate SUB that is curved and extends in the first direction DR1 and a plurality of light source units LSU disposed, e.g., mounted, on the light source substrate SUB. The light source units LSU may be disposed to be spaced apart along the extending direction of the light source substrate SUB at a uniform interval on the light source substrate SUB.

The light source units LSU generates light to be used in the display panel 110 and is disposed to face a side surface of the light guide plate 130 in the second direction DR2. The light generated in the light source LS is provided to the side surface of the light guide plate 130 in the second direction DR2. The side surface of the light guide plate 130 that faces the light source units LSU may be defined as a light incident part.

The light guide plate 130 may change a traveling direction of the light from the light source LS to allow the light to travel to the display panel 110. The reflection sheet 140 reflects the light emitted to a lower side of the light guide plate 130 and incident thereto so that the light is emitted upwardly back to the light guide plate 130.

The optical member 120 may include a diffusion sheet (not shown) and a prism sheet (not shown) disposed on the diffusion sheet. The diffusion sheet may diffuse the light provided from the light guide plate 130.

The prism sheet may collect the light diffused by the diffusion sheet in an upper direction that is perpendicular to the plane defined by the first direction DR1 and the second direction DR2. The light passing through the prism sheet may travels upward and be provided to the display panel 110 with uniform luminance distribution. The pixels of the display panel 110 may display an image by using the light provided from the backlight unit BLU.

The protection members 10 and 20 may include a first protection member 10 that accommodates the display panel 110 and a second protection member 20 coupled to the first protection member 10 to accommodate the backlight unit BLU. The first protection member 10 may be referred to as a mold frame, and the second protection member 20 may be referred to as a bottom chassis.

In such an embodiment, as illustrated in FIG. 3, the first and second protection members 10 and 20 may be curved with respect to the first direction DR1. In such an embodiment, as illustrated in FIG. 4, each of the first and second protection members 10 and 20 may have a flat shape in the second direction DR2.

The first protection member 10 may include or be formed of a metal such as plastic or aluminum. The first protection member 10 includes first and second sidewalls 11_1 and 11_2, a first extension part 12 connected to the first and second sidewalls 11_1 and 11_2, and a second extension part 13 connected to the first extension part 12.

Hereinafter, side surfaces facing each other of the first sidewalls 11_1 and side surfaces facing each other of the second sidewalls 11_2 may be defined as inner surfaces of the first and second sidewalls 11_1 and 11_2. Surfaces opposite to the inner surfaces of the first and second sidewalls 11_1 and 11_2 may be defined as outer surfaces of the first and second sidewalls 11_1 and 11_2.

Surface of the first and second sidewalls 11_1 and 11_2 between upper sides of the inner surfaces of the first and second sidewalls 11_1 and 11_2 and upper sides of the outer surfaces of the first and second sidewalls 11_1 and 11_2 may be defined as top surfaces of the first and second sidewalls 11_1 and 11_2. Surface of the first and second sidewalls 11_1 and 11_2 between lower sides of the inner surfaces of the first and second sidewalls 11_1 and 11_2 and lower sides of the outer surfaces of the first and second sidewalls 11_1 and 11_2 may be defined as bottom surfaces of the first and second sidewalls 11_1 and 11_2.

The top surface of each of the first and second sidewalls 11_1 and 11_2 may have a width less than that of the bottom surface of each of the first and second sidewalls 11_1 and 11_2. The width of each of the first and second sidewalls 11_1 and 11_2, which is defined as a distance between the inner surface of each of the first and second sidewalls 11_1 and 11_2 and the outer surface of each of the first and second sidewalls 11_1 and 11_2, may gradually increase from the top surface of each of the first and second sidewalls 11_1 and 11_2 to the bottom surface of each of the first and second sidewalls 11_1 and 11_2.

The outer surface of each of the first and second sidewalls 11_1 and 11_2 may have a protruding shape. The inner surface of each of the first and second sidewalls 11_1 and 11_2 may have a flat shape.

The first extension part 12 may be spaced apart from the top surface of each of the first and second sidewalls 11_1 and 11_2 with a predetermined distance, and connected to a predetermined area of the inner surface of each of the first and second sidewalls 11_1 and 11_2. The first extension part 12 extends in a direction perpendicular to the inner surface of each of the first and second sidewalls 11_1 and 11_2.

The second extension part 13 may be spaced apart from the inner surface of each of the first and second sidewalls 11_1 and 11_2 with a predetermined distance, and connected to a predetermined area of a lower surface of the first extension part 12. The second extension part 13 extends in a direction perpendicular to the first extension part 12.

The display panel 110 is disposed on the first extension part 12, and the side surface of the display panel 110 is disposed to be spaced apart from the inner surface of each of the first and second sidewalls 11_1 and 11_2 with a predetermined distance. The top surface of each of the first and second sidewalls 11_1 and 11_2 may be disposed on an upper s of the display panel 110. As illustrated in FIG. 4, a distance GP between the inner surface of each of the first sidewalls 11_1 facing each other in the second direction DR2 and the side surface (or the long side) of the display panel 110 may be equal to or greater than about 0.5 mm and equal to or less than about 1.0 mm.

The non-display area NDA of the display panel 110 is disposed on the first extension part 12. An adhesion member 30 may be disposed between the non-display area NDA of the display panel 110 and the first extension part 12. The adhesion member 30 may be a double-sided tape. The non-display area NDA of the display panel 110 may be adhered and fixed to the first extension part 12 by the adhesion member 30.

In such an embodiment, the first extension part 12 of the first protection member 10 may have a frame shape, and an opening OP that overlaps the display area DA of the display panel 110 is defined therein. The opening OP may be an empty space that is defined by the frame shape.

A bonding member 40 is disposed between the side surface of the display panel 110 and the inner surface of each of the first and second sidewalls 11_1 and 11_2. In an embodiment of a method of manufacturing the display apparatus 100, a liquid adhesion resin may be provided between the side surface of the display panel 110 and the inner surface of each of the first and second sidewalls 11_1 and 11_2. In such an embodiment, the liquid adhesion resin may be cured to form the bonding member 40. In such an embodiment, the side surface of the display panel 110 may be adhered and fixed to the inner surface of each of the first and second sidewalls 11_1 and 11_2 by the bonding member 40.

The second protection member 20 may include a bottom part 21 that is curved with respect to the first direction DR1 and a third sidewall 22 connected to an end of the bottom part 21 to extend parallel to the inner surfaces of the first and second sidewalls 11_1 and 11_2. The optical member 120, the light guide plate 130 and the reflection sheet 140 are disposed on the bottom part 21. The third sidewall 22 is inserted and disposed in a space between the inner surface of each of the first and second sidewalls 11_1 and 11_2 and the second extension part 13.

The bottom part 21 includes a protrusion P that protrudes upward from a lower surface of the bottom part 21. In an embodiment, as shown in FIGS. 3 and 4, the protrusion part P may be defined in a middle portion of the bottom part 21 or may be a protruded portion of the bottom part 21 in an area except for a predetermined area (e.g., a side area) of the bottom part 21, which is adjacent to a side surface of the bottom part 21.

The light source LS is disposed on the predetermined area of the bottom part 21 between the third sidewall 22 connected to a side of the bottom part 21 and the protrusion P. The light source LS is disposed on a side surface of the second extension part 13, which faces a side surface of the light guide plate 130 in the second direction DR2.

The light source substrate SUB is disposed on a side surface of the second extension part 13, which faces a side surface of the light guide plate 130 in the second direction DR2, and the light source units LSU are disposed to face the side surface of the light guide plate 130 in the second direction DR2.

The reflection sheet 140 is disposed on the protrusion P, and the light guide plate 130 is disposed on the reflection sheet 140. Although not shown, the reflection sheet 140 may be adhered and fixed to the protrusion P by the adhesion tape. The optical member 120 is disposed on the light guide plate 130.

A predetermined area of the optical member 120, which is adjacent to a side surface of the optical member 120, is disposed below the first extending part 12 or disposed on a lower surface of the first extension part 12. The side surface of the optical member 120 is disposed adjacent to a predetermined area of the second extension part 13, which is adjacent to the lower surface of the first extension part 12. The optical member 120 has a size greater than that of the light guide plate 130.

Referring to FIG. 6, the display panel 110 includes a first substrate 111, a second substrate 112 facing the first substrate 111, and a light crystal layer LC disposed between the first substrate 111 and the second substrate 112.

The pixel includes a transfer TR connected to a gate line GLi and a data line DLj, a liquid crystal capacitor Clc connected to the transistor TR, and a storage capacitor Cst parallelly connected to the liquid crystal capacitor Clc. In an embodiment, the storage capacitor Cst may be omitted. The gate line GLi may extend in the first direction DR1, and the data line DLj may extend in the second direction DR2.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer may serve as a dielectric. The pixel electrode PE is connected to the drain electrode of the transistor TR.

Although the pixel electrode PE has a non-slit structure in FIG. 6, an embodiment of the inventive concept is not limited thereto. In one alternative embodiment, for example, the pixel electrode PE may have a slit structure including a stem part having a cross shape and a plurality of branch parts radially or obliquely extending from the stem part.

The common electrode CE may be disposed over the second substrate 112. However, an embodiment of the inventive concept is not limited thereto. In one alternative embodiment, for example, the common electrode CE may be disposed on the first substrate 111. In such an embodiment, at least one of the pixel electrode PE and the common electrode CE may have the slit structure.

The storage capacitor Cst may include the pixel electrode PE, a storage electrode (not shown) that is branched from a storage line (not shown), and an insulation layer disposed between the pixel electrode PE and the storage electrode. The storage line is disposed on the first substrate 111. In an embodiment, the storage line may be simultaneously formed together with the gate line GLi on a same layer. The storage electrode may partially overlap the pixel electrode PE.

The pixel may further include a color filter CF for representing one of red, green, and blue colors. In an embodiment, the color filter CF may be disposed on the second substrate 112 as illustrated in FIG. 6. However, an embodiment of the inventive concept is not limited thereto. In one alternative embodiment, for example, the color filter CF may be disposed on the first substrate 111.

The transistor TR is turned on in response to a gate signal provided through the gate line GLi. A data voltage received through the data line DLj is provided to the pixel electrode PE of the liquid crystal capacitor Clc through the transistor TR that is turned on. A common voltage is applied to the common electrode CE.

An electric field is generated between the pixel electrode PE and the common electrode CE by a difference in voltage level between the data voltage and the common voltage. Liquid crystal molecules of the liquid crystal layer LC operate by the electric field generated between the pixel electrode PE and the common electrode CE. Light transmittance may be adjusted by the liquid crystal molecules that operate by the electric field to display an image.

A storage voltage having a uniform voltage level may be applied to the storage line. However, an embodiment of the inventive concept is not limited thereto. In one alternative embodiment, for example, the common voltage may be applied to the storage line. The storage capacitor Cst may supplement a voltage that is charged in the liquid crystal capacitor Clc.

Although FIG. 6 shows one pixel connected to the gate line GLi and the data line DLj for convenience of illustration and description, other pixels of the display panel 110 may have the same constituent as the pixel of FIG. 6.

Although a structure of the display apparatus 100 of FIG. 1 has been described above with reference to FIGS. 2 to 6, the display apparatus 200 of FIG. 2 may have the same structure as the display apparatus 100 of FIG. 1 except for a concave shape of each of second sidewalls 11_2'.

Although not shown, in an embodiment of the display apparatus 200 shown in FIG. 2, each of the distance GP between the inner surface of each of the first sidewalls 11_1 facing each other in the second direction DR2 and the side surface (or the long side) of the display panel 110 and a distance GP between an inner surface of each of the second sidewalls 11_2' facing each other in the first direction DR1 and the side surface (the short side) of the display panel 110 may be equal to or greater than about 0.5 mm and equal to or less than about 1.0 mm.

Figure 7:
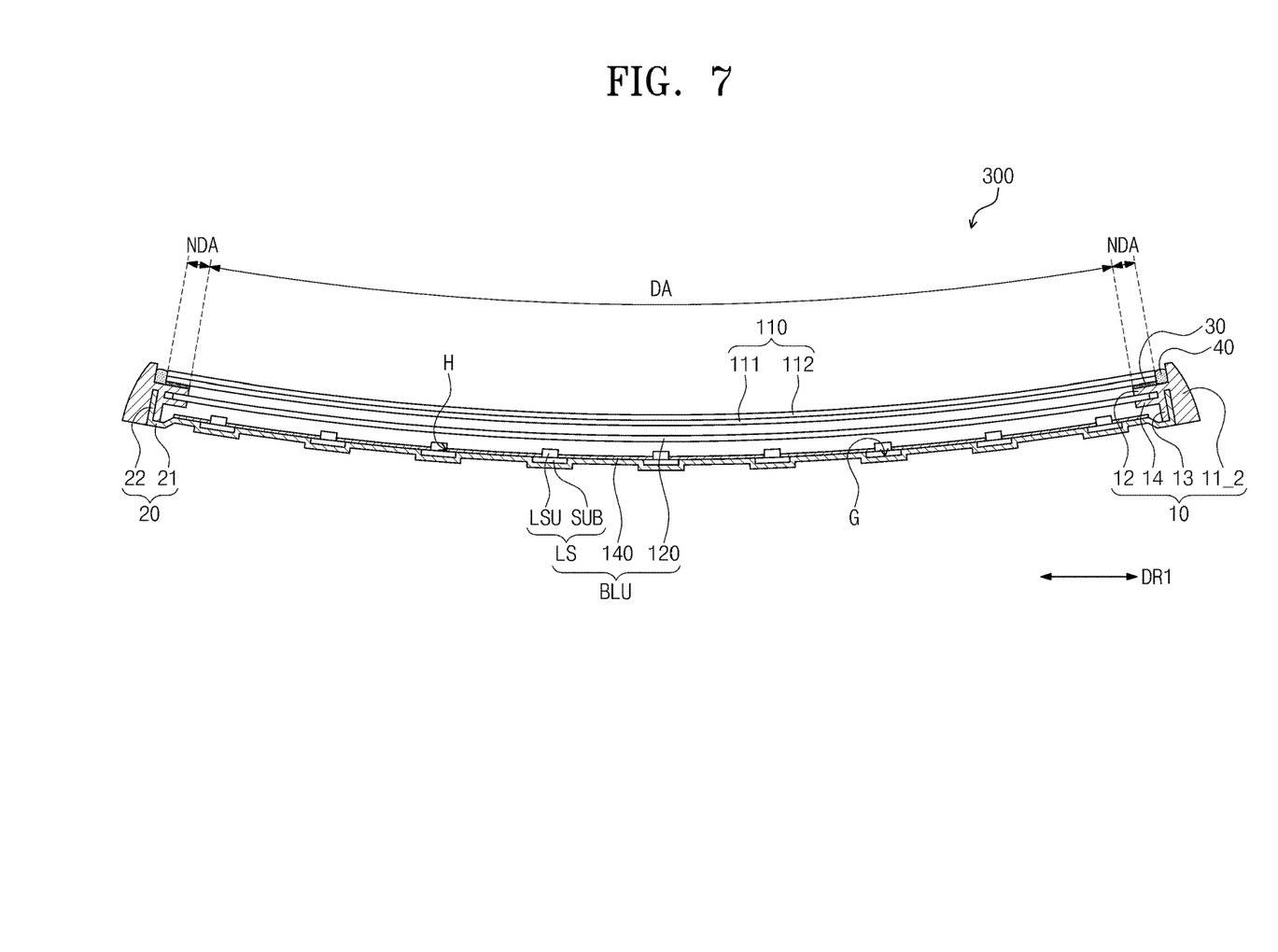
FIG. 7 is a cross-sectional view of another alternative embodiment of a display apparatus according to the inventive concept.

FIG. 7 is a cross-sectional view of an alternative embodiment of a display apparatus according to the inventive concept.

FIG. 7 illustrates a cross-sectional view of a display apparatus 300, which correspond to FIG. 3, which is a cross-sectional view taken along line I-I' of FIG. 1.

The display apparatus 300 of FIG. 7 is substantially the same as the display apparatus 100 or 200 of FIG. 1 or 2, except for first and second protection members 10_2 and 20_1, a light source LS_1, and a reflection sheet 140_1 and that the light guide plate is omitted. The same or like elements shown in FIG. 7 have been labeled with the same reference characters as used above to describe the embodiments of the display apparatus 100 or 200 shown in FIG. 1 or 2, and any repetitive detailed description thereof will hereinafter be omitted or simplified.

Referring to FIG. 7, in an embodiment, the first protection member 10_2 includes a third extension part 14 connected to the inner surface of the second extension part 13, which is opposite to the outer surface of the second extension part 13 facing the inner surface of each of the first and second sidewalls 11_1 and 11_2. In an embodiment, as shown in FIG. 7, the first protection member 10_2 except for the third extension part 14 may have the same constituent as the first protection member 10 of FIG. 3.

The third extension part 14 may be spaced downward from the first extension part 12 and extend from a predetermined area of the second extension part 13. The third extension part 14 extends perpendicular to the second extension part 13. A predetermined area of the optical member 120, which is adjacent to the side surface of the optical member 120, is disposed between the first extension part 12 and the third extension part 14.

A bottom part 21 of the second protection member 20_1 has a plurality of grooves G that are recessed downward from an upper surface of the bottom part 21. In an embodiment, as shown in FIG. 7, the third sidewall 22 connected to an end of the bottom part 21 has the same constituent as the third sidewall 22 of FIG. 3.

The grooves G are defined at a uniform interval in the first direction DR1. Although not shown, the grooves G may substantially extend in the second direction DR2. The light sources LS_1 include a plurality of light source substrates SUB and a plurality of light source units LSU respectively disposed, e.g., mounted, on the light source substrates SUB. Although not shown, the light source substrates SUB may extend in the second direction DR2 and then be disposed in or inserted into the grooves G, respectively.

In such an embodiment, a plurality of holes H corresponding to the light source units LSU is defined through the reflection sheet 140_1. The reflection sheet 140_1 may be disposed on the bottom part 21 of the second protection member 20_1, and the light source units LSU may be inserted into the holes H of the reflection sheet 140.

Each of the light source units LSU has a thickness greater than that of the reflection sheet 140_1. Thus, each of the light source units LSU may have a top surface that is higher than that of the top surface of the reflection sheet 140_1. The light source units LSU and the reflection sheet 140_1 may be disposed below the third extension part 14.

The backlight unit BLU having the above-described constituents may be defined as a direct type backlight unit. The optical member 120 of the direct type backlight unit may further include a diffusion plate (not shown) for diffusing light and having rigidity. The diffusion sheet and the prism sheet are disposed on the diffusion plate. The diffusion sheet and the prism sheet which are bendable sheets may be stably disposed on the diffusion plate having the rigidity.

The first and second sidewalls 11_1 and 11_2 of the display apparatus 300 including the direct type backlight unit BLU may be substantially the same as the first and second sidewalls 11_1 and 11_2 of FIG. 1. However, an embodiment of the inventive concept is not limited thereto. In one alternative embodiment, for example, the first and second sidewalls 11_1 and 11_2 of the display apparatus 300 may have the same shape as the first and second sidewalls 11_1 and 11_2' of FIG. 2. In such an embodiment of the display apparatus 300 the display panel 110 may be effectively prevented from being damaged to improve product reliability.

In embodiments of the display apparatus according the inventive concept, as described herein the space between the edge of the display panel and the inside of the protection member corresponding to the edge of the display panel may be sufficiently secured to prevent the display panel from being damaged, thereby improving the product reliability.

It will be apparent to those skilled in the art that various modifications and variations can be made in the inventive concept. Thus, it is intended that the disclosure covers the modifications and variations of this invention provided they come within the scope of the appended claims and their equivalents. Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus, comprising:
    a display panel; and
    a first protection member which accommodates the display panel,
    wherein the first protection member comprises:
    first sidewalls facing each other; and
    second sidewalls connected to ends of the first sidewalls to face each other,
    wherein the first and second sidewalls are disposed to surround a side surface of the display panel,
    the first sidewalls are curved symmetrical to each other,
    a distance between central portions of the first sidewalls facing each other is a minimum distance between the first sidewalls, and
    a distance between ends of the first sidewalls facing each other is a maximum distance between the first sidewalls.

2. The display apparatus of claim 1, wherein the display panel and the first protection member are curved with respect to a first direction.

3. The display apparatus of claim 1, wherein the display panel comprises:
    long sides extending in a first direction to face each other; and
    short sides extending in a second direction crossing the first direction,
    wherein the short sides are connected to ends of the long sides to face each other.

4. The display apparatus of claim 3, wherein
    the first sidewalls are disposed to correspond to the long sides of the display panel, and
    the second sidewalls are disposed to face the short sides of the display panel and extend in the second direction.

5. The display apparatus of claim 3, wherein
    a top surface of each of first and second sidewalls has a width less than a width of a bottom surface of each of the first and second sidewalls,
    a distance between each of inner surfaces of the first and second sidewalls, which are defined as side surfaces facing each other of the first and second sidewalls and each of outer surfaces of the first and second sidewalls, which are defined as surfaces opposite to the inner surfaces of the first and second sidewalls, gradually increases from the top surface of each of the first and second sidewalls to the bottom surface of each of the first and second sidewalls, and
    each of the outer surfaces of the first and second sidewalls has a protruding shape.

6. The display apparatus of claim 5, wherein
    the top surface of each of the first and second sidewalls is disposed above the display panel, and
    the side surface of the display panel is disposed to be spaced apart from an inner surface of each of the first and second sidewalls with a predetermined distance.

7. The display apparatus of claim 6, further comprising:
    a bonding member disposed between the side surface of the display panel and the inner surface of each of the first and second sidewalls to allow the side surface of the display panel to adhere to the inner surface of each of the first and second sidewalls.

8. The display apparatus of claim 5, wherein a distance between an inner surface of each of the first sidewalls and the side surface of the display panel facing the inner surface of each of the first sidewalls in the second direction is equal to or greater than about 0.5 millimeter and equal to or less than about 1.0 millimeter.

9. The display apparatus of claim 5, wherein the first protection member further comprises:
a first extension part spaced apart from the top surface of each of the first and second sidewalls with a predetermined distance, wherein the first extension part is connected to a predetermined area of an inner surface of each of the first and second sidewalls; and
a second extension part spaced apart from the inner surface of each of the first and second sidewalls with a predetermined distance, wherein the second extension part is connected to a predetermined area of a lower surface of the first extension part,
wherein the first extension part extends perpendicular to the inner surface of each of the first and second sidewalls, and
the second extension part extends perpendicular to the first extension part.

10. The display apparatus of claim 9, wherein an area of the display panel comprises:
a display area; and
a non-display area around the display area,
wherein the non-display area of the display panel is disposed on the first extension part.

11. The display apparatus of claim 10, further comprising:
an adhesion member disposed between the non-display area of the display panel and the first extension part to allow the non-display area of the display panel to adhere to the first extension part.

12. The display apparatus of claim 9, further comprising:
an optical member disposed under the display panel;
a light guide plate disposed under the optical member;
a light source disposed adjacent to a side surface of the light guide plate in the second direction;
a reflection sheet disposed under the light guide plate; and
a second protection member coupled to the first protection member to accommodate the optical member, the light guide plate, the light source and the reflection sheet,
wherein the second protection member is curved with respect to the first direction.

13. The display apparatus of claim 12, wherein
a predetermined portion of the optical member, which is adjacent to a side surface of the optical member, is disposed under a lower surface of the first extension part, and
the side surface of the optical member is disposed adjacent to a predetermined area of the second extension part, which is adjacent to the lower surface of the first extension part.

14. The display apparatus of claim 12, wherein the second protection member comprises:
a bottom part curved with respect to the first direction; and
a third sidewall connected to an end of the bottom part to extend parallel to the inner surface of each of the first and second sidewalls,
wherein the third sidewall is inserted into a space between the inner surface of each of the first and second sidewalls and the second extension part.

15. The display apparatus of claim 14, wherein
the bottom part comprises a protrusion which protrudes upward from an area of the bottom part except for a predetermined area of the bottom part, which is adjacent to a side surface of the bottom part,
the reflection sheet, the light guide plate and the optical member are disposed on the protrusion, and
the light source is disposed on a side surface of the second extension part, which faces the side surface of the light guide plate in the second direction.

16. The display apparatus of claim 9, further comprising:
an optical member disposed under the display panel;
a light source disposed under the optical member;
a reflection sheet disposed under the optical member; and
a second protection member comprising:
a bottom part curved with respect to the first direction; and
a third sidewall connected to an end of the bottom part to extend parallel to the inner surface of each of the first and second sidewalls and inserted into a space between the inner surface of each of the first and second sidewalls and the second extension part,
wherein the first protection member further comprises a third extension part spaced apart from the first extension part and connected to an inner surface of the second extension part, which is opposite to an outer surface of the second extension part facing the inner surface of each of the first and second sidewalls, to extend perpendicular to the second extension part, and
the second protection member is curved with respect to the first direction, and
a predetermined area of the optical member, which is adjacent to a side surface of the optical member, is disposed between the first extension part and the third extension part.

17. The display apparatus of claim 16, wherein
the bottom part comprises a plurality of grooves, which are recessed downward from a top surface of the bottom part and extend in the second direction,
the light source comprises:
a plurality of light source substrates extending in the second direction; and
a plurality of light source units disposed on the light source substrates,
a plurality of holes corresponding to the light source units is defined in the reflection sheet,
the light source substrates are disposed in the grooves,
the reflection sheet is disposed on the bottom part, and
the light source units are inserted into the holes.

18. The display apparatus of claim 1, wherein
the second sidewalls are curved symmetrical to each other,
a distance between central portions of the second sidewalls facing each other is a minimum distance between the second side walls, and
a distance between ends of the second sidewalls facing each other is a maximum distance between the second side walls.

19. The display apparatus of claim 18, wherein
a distance between the inner surface of each of the first sidewalls and the side surface of the display panel facing each other in the second diction is equal to or greater than about 0.5 millimeter and equal to or less than about 1.0 millimeter, and
a distance between the inner surface of each of the second sidewalls and the side surface of the display panel facing each other in the first direction is equal to or greater than about 0.5 millimeter and equal to or less than about 1.0 millimeter.

20. A display apparatus, comprising:
a display panel;
a first protection member which supports the display panel and surrounds a side surface of the display panel; and
an adhesion member disposed between the side surface of the display panel and an inner surface of the first protection member, which faces the side surface of the display panel,
wherein the first protection member comprises:
first sidewalls facing each other; and
second sidewalls connected to ends of the first sidewalls to face each other,
wherein the first sidewalls are curved with reference to the side surface of the display panel facing the first sidewalls, and have concave shapes symmetrical to each other, and
the second sidewalls are curved with reference to the side surface of the display panel facing the second sidewalls and have concave shapes symmetrical to each other.

* * * * *